United States Patent
Van Den Hamer et al.

(10) Patent No.: US 9,619,742 B2
(45) Date of Patent: Apr. 11, 2017

(54) SELF-DESCRIPTIVE DATA TAG

(75) Inventors: Peter Van Den Hamer, Eindhoven (NL); Hendrik Dirk Lodewijk Hollmann, Eindhoven (NL); Maarten Peter Bodlaender, Eindhoven (NL)

(73) Assignee: NXP B.V., Eindhoven (NL)

( * ) Notice: Subject to any disclaimer, the term of this patent is extended or adjusted under 35 U.S.C. 154(b) by 2317 days.

(21) Appl. No.: 10/145,677

(22) Filed: May 15, 2002

(65) Prior Publication Data

US 2003/0033280 A1 Feb. 13, 2003

(30) Foreign Application Priority Data

May 18, 2001 (EP) .................................... 01201882

(51) Int. Cl.
 *G06F 17/30* (2006.01)
 *G06K 19/07* (2006.01)
 *G06F 17/21* (2006.01)
 *G06F 17/27* (2006.01)
 *G06F 17/22* (2006.01)

(52) U.S. Cl.
 CPC ............ *G06K 19/07* (2013.01); *G06F 17/218* (2013.01); *G06F 17/2258* (2013.01); *G06F 17/271* (2013.01); *G06F 17/3028* (2013.01)

(58) Field of Classification Search
 CPC ............. H04L 49/3009; G06F 17/3028; G06F 17/218; G06F 17/272
 USPC ............................................. 707/4, 100, 791
 See application file for complete search history.

(56) References Cited

U.S. PATENT DOCUMENTS

| | | | |
|---|---|---|---|
| 4,742,215 A | 5/1988 | Daughters et al. | ............ 235/487 |
| 5,027,376 A * | 6/1991 | Friedman | ................ H03M 7/42 |
| | | | 341/65 |
| 5,293,424 A | 3/1994 | Holtey et al. | .................... 380/23 |
| 5,384,749 A | 1/1995 | Lisart et al. | ............. 365/230.01 |
| 5,467,081 A | 11/1995 | Drews et al. | ............ 340/825.34 |

(Continued)

FOREIGN PATENT DOCUMENTS

| | | | |
|---|---|---|---|
| FR | 2626696 | 8/1989 | ............... G06K 1/20 |
| FR | 2786635 | 6/2000 | ............. H03M 7/30 |

(Continued)

OTHER PUBLICATIONS

Microsoft Computer Dictionary, $5^{th}$ ed., "tag" definition, p. 511 (Microsoft_tag_def.pdf).*

(Continued)

*Primary Examiner* — Thanh-Ha Dang

(57) ABSTRACT

A data tag containing self-descriptive data, a method for reading such a data tag and a system for interpreting such a data tag are disclosed. Characterizing information about a first data element stored in a memory of the data tag is stored in a first header preceding a first data element. In addition, characterizing information about a second data element stored in the memory of the data tag is stored in a second header preceding a second data element. The application of a multitude of descriptive headers, each characterizing a data element stored in the data tag memory, facilitates flexible data storage on such devices. Furthermore, it also facilitates data compression due to the fact that field lengths can be characterized as well, thus excluding the presence of redundant bits in the data stored in the memory.

18 Claims, 3 Drawing Sheets

(56) References Cited

U.S. PATENT DOCUMENTS

| | | | |
|---|---|---|---|
| 5,548,751 A | 8/1996 | Ryu et al. ..................... 395/600 |
| 5,804,803 A * | 9/1998 | Cragun et al. ................ 235/375 |
| 5,966,082 A * | 10/1999 | Cofino ............... G06K 19/0723 |
| | | | 340/10.51 |
| 5,971,277 A * | 10/1999 | Cragun et al. ........... 235/462.01 |
| 5,990,899 A * | 11/1999 | Whitten ..................... G06T 9/00 |
| | | | 345/427 |
| 6,047,233 A * | 4/2000 | Salvatore, Jr. ............. G01S 7/22 |
| | | | 701/120 |
| 6,172,596 B1 * | 1/2001 | Cesar ................... G06K 7/0008 |
| | | | 340/10.41 |
| 6,259,367 B1 * | 7/2001 | Klein ......................... B25J 9/08 |
| | | | 235/375 |
| 6,367,011 B1 * | 4/2002 | Lee ......................... G06F 21/77 |
| | | | 380/255 |
| 6,396,958 B1 * | 5/2002 | Wilson ................... H04N 19/60 |
| | | | 375/E7.144 |
| 6,400,272 B1 * | 6/2002 | Holtzman ............ G06K 7/0008 |
| | | | 340/572.1 |
| 6,480,100 B1 * | 11/2002 | Frieden ................ G06K 7/0008 |
| | | | 340/10.1 |
| 6,501,962 B1 * | 12/2002 | Green ................... H04W 8/205 |
| | | | 455/186.1 |
| 6,512,779 B1 * | 1/2003 | Vollmer et al. ............... 370/470 |
| 6,748,388 B1 * | 6/2004 | Kasamsetty et al. .......... 707/10 |
| 6,853,294 B1 * | 2/2005 | Ramamurthy ...... G07C 9/00111 |
| | | | 340/10.1 |
| 7,156,301 B1 * | 1/2007 | Bonalle ................. G06K 19/04 |
| | | | 235/380 |
| 7,312,707 B1 * | 12/2007 | Bishop ................... G06Q 20/00 |
| | | | 340/5.52 |
| 7,406,439 B2 * | 7/2008 | Bodin ............. G06K 19/07758 |
| | | | 340/572.1 |
| 7,588,185 B2 * | 9/2009 | Berquist ............... G07G 1/0045 |
| | | | 235/383 |
| 7,818,423 B1 * | 10/2010 | Philyaw ............... G06Q 20/102 |
| | | | 705/40 |
| 7,837,116 B2 * | 11/2010 | Morrill Webb .......... B41M 3/14 |
| | | | 235/487 |
| 7,967,199 B2 * | 6/2011 | Linton ................. G07G 1/0045 |
| | | | 235/382 |
| 8,805,747 B2 * | 8/2014 | Zimberoff ............... H04L 63/10 |
| | | | 705/330 |
| 2002/0073399 A1 * | 6/2002 | Golden ............... G06F 17/2247 |
| | | | 717/114 |
| 2002/0095590 A1 * | 7/2002 | Douceur ............. G06F 21/6209 |
| | | | 713/190 |
| 2002/0106019 A1 * | 8/2002 | Chaddha ................ H04N 19/51 |
| | | | 375/240.02 |
| 2002/0112116 A1 * | 8/2002 | Nelson ................ G06F 12/0246 |
| | | | 711/103 |
| 2003/0206124 A1 * | 11/2003 | Lovell ..................... H03M 9/00 |
| | | | 341/50 |
| 2006/0129648 A1 * | 6/2006 | Dharmarajan ...... H04L 63/0428 |
| | | | 709/206 |
| 2008/0104097 A1 * | 5/2008 | Blair ................. G06F 17/30067 |

FOREIGN PATENT DOCUMENTS

| | | | |
|---|---|---|---|
| JP | 5241775 | 9/1993 | |
| JP | 8106516 | 4/1996 | |
| JP | 9231113 | 9/1997 | |
| JP | 9330383 | 12/1997 | |
| JP | 11015940 | 1/1999 | |
| JP | 11110511 | 4/1999 | |
| WO | WO9952065 | 10/1999 | ............. G06K 19/07 |

OTHER PUBLICATIONS

International Search Report, PCT/IB2002/001704, Aug. 2, 2002.

\* cited by examiner

SELF-DESCRIPTIVE DATA TAG

FIELD OF THE INVENTION

The invention relates to a data tag comprising self-descriptive data, the self-descriptive data comprising a first header describing a first data element. The invention also relates to a method, device and system for reading self-descriptive data from a data tag.

BACKGROUND

A Massachusetts Institute of Technology (MIT) proposal for a data format for storing self-descriptive data in a RF ID tag and serially reading self-descriptive data from such a data tag has been disclosed in http://auto-id.mit.edu/pdf/MIT-AUTOID-WH-001.pdf, December 2000, which has been retrieved from the WWW at Mar. 7, 2001. The way data is stored in and read from data tags with limited storage capacity, like radio frequency identification (RF ID) tags, smart cards and similar devices, is highly relevant both in terms of standardization of allowed data formats, as well as in terms of the compactness of the data stored in such tags due to the low-cost demand for such devices. The latter for instance applies to RF ID tags, especially in application areas where the tags are to compete with other low-cost identification means, e.g. bar codes. An obvious advantage of using RF ID tags in product labeling is that they can be read out from relatively large distances with high reliability, in contrast with bar codes that have to be read out in line-of-sight with the bar code reader, which is much more error-sensitive. A drawback, however, is that RF ID tags are more costly than bar codes. Therefore, maximizing the utilization of the storage capacity of a RF ID tag is a very important issue. The proposed MIT standard, the so-called electronic Product Code (ePC), embodies a 96-bit data format developed for read-only tags. The 96 bits are segmented in a 8-bit header and three data elements, each with fixed lengths. The header can contain metadata indicating the format, total length or various fixed-length field partitions of the RF ID tag, which ensures flexibility of the standard for enabling the future use of larger sized fixed-length tags. In the ePC, the first two data elements, or data partitions, are assigned to a 24-bit manufacturer code and 24-bit product code, whereas the final 40-bit element is assigned to the product serial number.

A major drawback of such a standard, however, is that the assignment of the segment dimensions is based on worst-case scenarios, i.e. the dimensions have been chosen such that they facilitate the storage of excessivily large numbers. Although this can be a guarantee for long-term application of the standard within markets with expanding sales volumes, in practice, it also implies that in many cases a significant number of bits in the tag are redundant. This is an unwanted side effect of a fixed length format in terms of tag cost price.

Another major disadvantage is that the flexibility of information stored in the tag is restricted by pre-assigning the three segments. It is foreseen that for certain product domains, other information can be highly relevant. As an example, a data tag attached to an audio compact disk (CD) enclosure could encode the CD's publisher in field type #1, the name of the main artist in field type #2, a code for the title in field type #3, and the data of publication in field type #6. As an alternative example, a data tag attached to an item being shipped via a parcel delivery service could contain fields containing the shipment's identification, priority, submission time, and final destination. As a final example, a data tag worn by an employee could contain fields with the employee's identification number, the employee's name, a security clearance class, the expiration date of the data carrier and a digital photograph of the employee.

In such cases, the three pre-assigned data fields are of limited use, or the fixed 96-bit length of the tag might not suffice to store all relevant information in the tag.

SUMMARY OF THE INVENTION

Accordingly, it is an object of the present invention to provide a data tag capable of carrying a flexible amount of data fields, a method for reading a flexible amount of data fields from such a data tag, a tag reader for reading a flexible amount of data fields from such a data tag and a system that is capable of reading tags carrying a flexible amount of data fields.

To this end, the self-descriptive data further comprises a second header describing a second data element. This aspect as well as other aspects of the invention are defined by the independent claims, with the dependent claims defining advantageous embodiments. By the introduction of a header to every data element, each of the data elements residing in the data tag can be fully characterized by the metadata in its dedicated header. This way, all format information can be read from the tag on-the-fly, and, as a result, the data stream can be parsed on receival by a tag reader architecture, thus facilitating flexible tag sizes and flexible field assignments.

Preferably, the first header comprises a description of a length of the first data element, and the second header comprises a description of a length of the second data element. By including the length of a data element in the header, the occurrence of redundant bits can be avoided by matching the field length to the number of relevant bits of the stored information. This leads to an intriguing counter-intuitive phenomenon: the addition of bits in the form of metadata can often lead to a reduction of the total number of bits required to store a data element. It is emphasized that this is a non-obvious difference in the way metadata usually is applied. In general, metadata is used to achieve portability, i.e. platform independence, of the data, as for instance is the case within the extended markup language (XML). In such applications, the addition of metadata leads to an increase rather than a decrease of the total size of the data involved.

Advantageously, the first header comprises a description of a field type of the first data element, and the second header comprises a description of a field type of the second data element. This is an important feature, because the presence of this information in the metadata enables the definition of a wide variety of data types in contrast to the currently proposed MIT standard, which defines just three available field types for the data tag.

It is an advantage if the first and the second header are present in a compressed form. In order to minimize the additional size of the data introduced by the inclusion of multiple headers in the data tag, the headers can be compressed using conventional prefix code compression techniques similar to Huffman encoding, thus further reducing the number of necessary bits to describe the required information, which leads to a further reduction in tag cost price.

It is another advantage if the first data element is present in a first compressed form and that the second data element is present in a second compressed form. It is well known that different data types can have different optimal encoding methods. By allowing each data type to be compressed by its most effective compression technique, the total size of the data in the data tag can be reduced even further, leading to yet another reduction in tag cost price.

It is yet another advantage if the description of a field type of the first data element is directly represented by a first numeric value, the description of a field type of the second data element is indirectly represented by a second numeric value, said second numeric value being a difference between the first numeric value and a third numeric value directly representing the field type of the second data element.

Especially in cases where the field types are ordered in, for instance, an ascending or descending order with respect to their position in a field type look-up table or a similar data structure, extremely compact encoding of field types can be obtained when a next field type is described in terms of the difference between the actual field type table value and its predecessor field type table value rather than describing it in terms of its actual field type table value. This way of encoding is particularly effective if the self-descriptive data consists of a contiguous succession of different field types.

It is yet another advantage if at least one of the first header and the second header additionally comprises a bit pattern for checking the correctness of the self-descriptive data. Error correction is an important issue in product identification reliability. A frequently used technique for checking the correctness of, for instance, credit card number, integrated services digital network (ISDN) numbers and other identification codes, is by applying a check sum that stands in some mathematical relation to the individual digits of an identification number. The inclusion of such check sums in the headers enables versatile and robust error checking of the self-descriptive data residing in the data tag, thus increasing reliability.

In addition, it is an advantage if at least one of the first and the second data element comprises a uniform resource identifier (URI). An URI is a short string of characters identifying an abstract or physical resource. An example of an URI is a uniform resource locator (URL) pointing to a web page of the WWW. By storing a URI in at least one of the data elements of the data tag, the information retrieved from the data tag can be fed directly to a web browser without having to retrieve the URI from external sources like dedicated databases. Inclusion of an URI in the data tag provides a wide array of business-to-business (B2B) or business-to-consumer (B2C) possibilities, like the retrieval of relevant product information or system software upgrades from the WWW.

It is yet another advantage if at least one of the first and second data element comprises an internet protocol (IP) address. Storage of an IP address in at least one of the data elements of the data tag enables direct computer to computer accesses, which for instance can also be used for the retrieval of product software from a dedicated server with the appropriate IP address. It is obvious that many other internet applications can be realized, and the inclusion of an IP address in the data tag therefore provides a wide variety of B2B and B2C opportunities.

The inclusion of multiple headers in the data tag, each dedicated to describing the information of a data element enables reading of versatile data tags like RF ID tags with customized data formats and sizes. This is an important feature, because it dramatically broadens the application domain of such tags, something that is difficult to achieve by using tags equipped with fixed formats and fixed sizes.

In contrast to data streams consisting of prefixed data elements, when dealing with data streams containing data elements with flexible formats, field types and sizes, a system arranged for reading such data tags cannot immediately interpret the data read from the data tag. The system has to be extended with a module capable of parsing the data stream read from the data tag. Such a modules can recognize and transform the various elements in the data stream by interpreting the headers and modifying the accompanying data elements according to the header information, after which the module can output the transformed data elements to the appropriate component of the system.

The data tag reader of the aforementioned system can also be produced independently. This is especially useful within application domains utilizing plug-and-play peripherals, e.g. personal computers.

BRIEF DESCRIPTION OF THE DRAWINGS

The invention is described in more detail and by way of non-limiting example with reference to the accompanying drawings wherein.

DETAILED DESCRIPTION

Figure 1A:
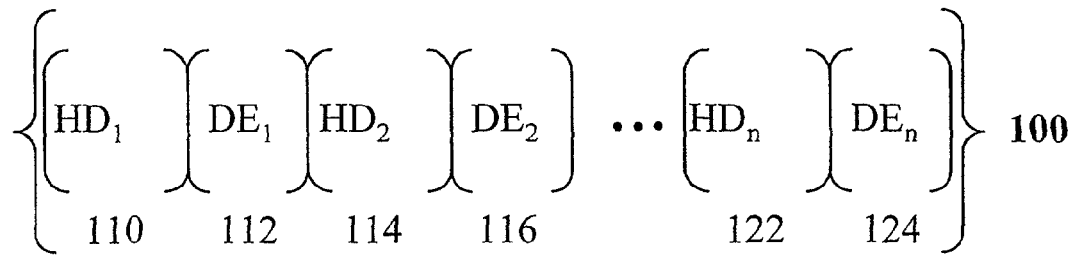
FIG. 1a, 1b, and 1c depicts a number of data formats of the tag according to the invention.
Figure 1B:
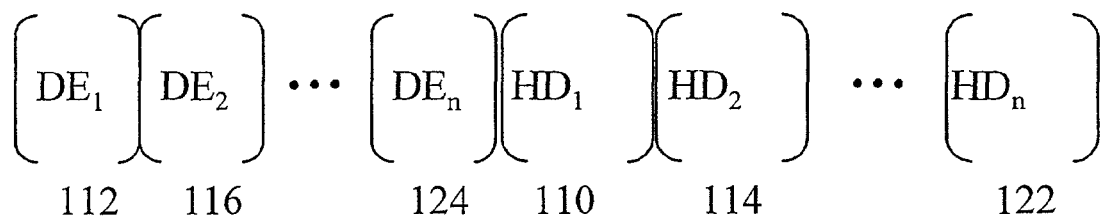
Figure 1C:
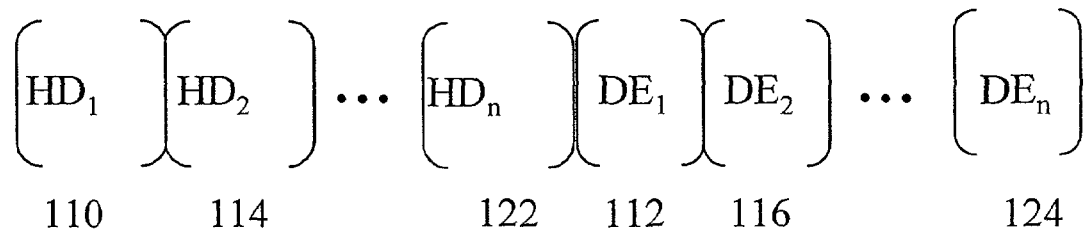

In FIG. 1, three possible data formats for storing in and reading from a data tags are depicted, all three falling within the scope of claim 1. FIG. 1(a) shows the preferred embodiment of the data format 100, wherein a first header (HD) 110 precedes a first data element (DE) 112, followed by a second header 114 and a second data element 116. The main advantage of this partitioning scheme is that after reading the first header 110 all information concerning first data element 112 has been received, and this data element can directly be read and interpreted from a data stream with data format 100. As a result, a tag reader only requires very limited storage facilities, which contributes to a low cost price for such devices. The data formats presented in FIGS. 1(b) and 1(c) have this advantage to a lesser degree. In FIG. 1(b), the complete data stream has to be stored before the data elements can be interpreted. This can be done by parsing the stream in a reverse way, i.e. from back to front. The data format presented in FIG. 1(c) suffers from a similar complication. First, all headers have to be stored, after which data elements 112, 116 and 124 can be interpreted on an individual basis. However, each of the headers 110, 114 and 122 then has to be retrieved from a memory, which introduces storage issues causing unnecessary complexity in the reader configuration. Therefore, due to its low parsing complexity and minimal storage requirements, data format 100 is the preferred format. However, it should be obvious to a person moderately skilled in the art that many other variations of these partitioning schemes can be constructed without departing from the here presented teachings. It is hereby emphasized that the three data formats are merely intended to serve as an example, and that they should not be considered limiting to the scope of the invention. In addition, the number of headers and data fields used to describe these teachings are exemplary only, and larger number of headers and data fields can be used without departing from the scope of the invention.

Figure 2A:
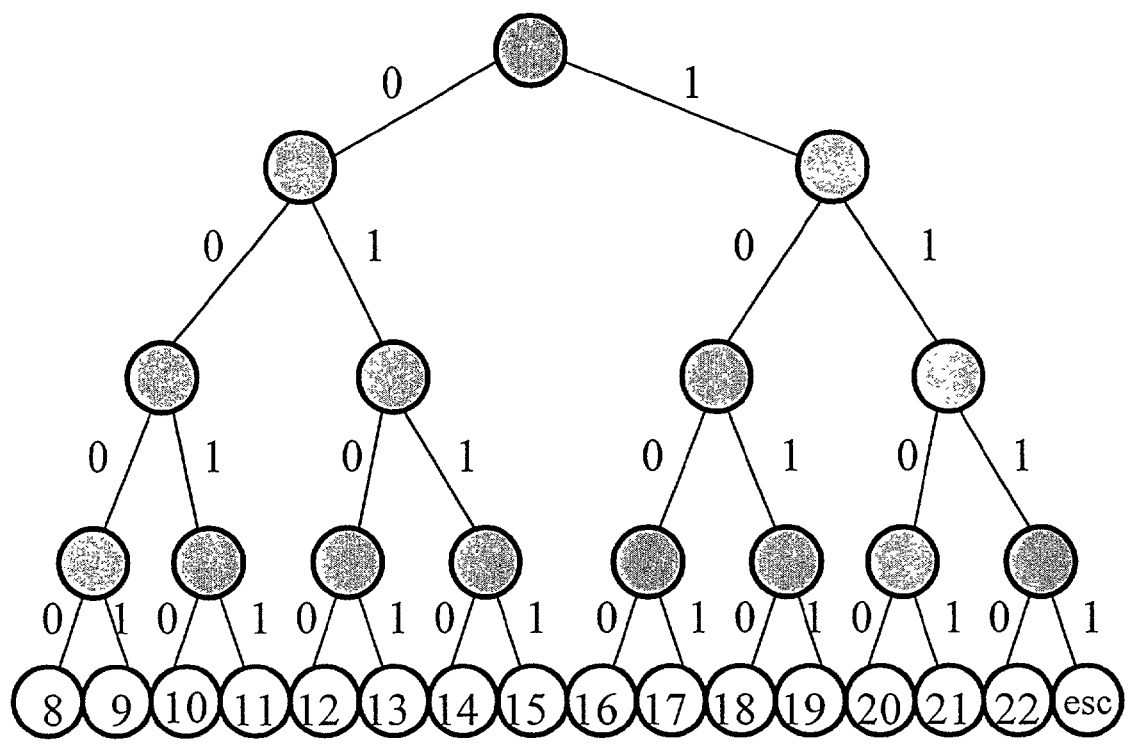
FIG. 2a shows an example of encoding/interpreting data element information in a header.

FIG. 2a serves as an example for the way the metadata in headers 110, 114 and 122 can be defined. It is emphasized that this particular encoding scheme is based upon existing encoding techniques. Preferably, variable length codes like prefix codes, which are related to Huffman encoding, is used. Basic principle of such an encoding technique is that a range of most common values is encoded as a minimized number of bits. In this particular example, a length of a data element ranging from 8-22 bits is specified by four bits. For instance, a length of 15 bits of a first data element 112 as depicted in FIG. 1 can be encoded in header 110 with bit pattern '0111'. This meaning of this pattern can be retrieved from FIG. 2a by starting at the top node of the binary decision tree, and descending to the leafs of the tree by taking the branches on the basis of the aforementioned bit sequence. The bit pattern '1111' has a special meaning in this example. It serves as a prefix for an extended branch of the tree (not shown), in which the values outside the range of most common values are defined. Obviously, longer bit sequences of 5 or more bits are required to define these less common values, and, as a result, their definition will be less compact. Note that the branch below the esc prefix can be a repetitive structure of arbitrary depth, thereby allowing the encoding of arbitrary lengths. Furthermore, a predefined value in the tree can be given a special meaning, i.e. defining a terminator symbol that enables the recognition of the end of the data stream by a tag reader.

Figure 2B:
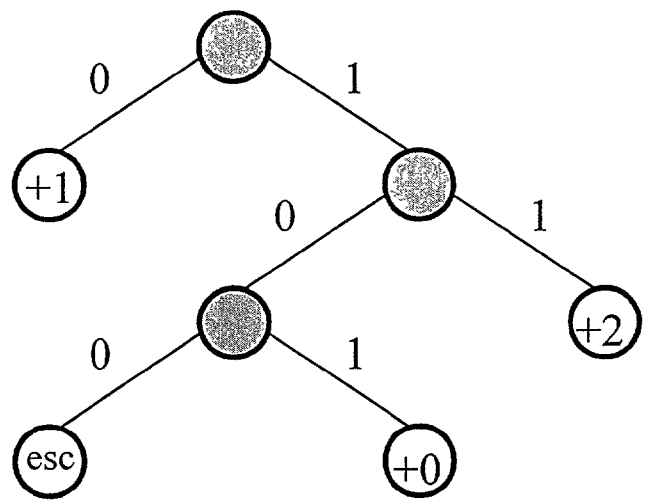
FIG. 2b shows another example of encoding/interpreting data element information in a header.

In addition, the field type of a data element can be encoded in a similar fashion. It is emphasized that the phrase 'field type' rather than 'data type' is used, because the latter phrasing is commonly associated with mathematically defined types like integers, reals, strings and so on. Here, the field type of a data element will usually have a practical meaning, like 'weight in grammes', 'production date', 'best before date' and so on. In many applications of data tags, the field types present in the tag will exhibit some logical ordering, like producer, product type and product identification number. If these field types are assigned numeric values arranged in a sorted, e.g. ascending, increasing, descending or decreasing, order, additional field type compression can be achieved by storing differences between field types of successive data elements. FIG. 2b is an example of a compact encoding scheme based on such a delta mechanism. When retrieving the field types from a lookup table or some other data structure, the single bit '0' denotes the 'field type+1' value, whereas the two-bit string '11' denotes the 'field type+2' value. This way, if an ordering of successive field types is indeed present in the self-descriptive data, the individual field types can be encoded by a single bit each, thus providing extremely compact headers.

Binary decision trees can also be combined to encode combinations of information, like data element type and data element length. For instance, a two bit-wide tree can be used to label three different element types, like producer='00', product='01' and product ID='10', and the tree of FIG. 2a can be concatenated with this two bit-wide tree to specify the length of a data element. Now, a bit pattern '001100' would characterize a data element of type producer, as defined by the leading '00', with an element length of 20 bits, as specified by the bit pattern '1100' in FIG. 2a. Examples of concatenated binary decision tree encoding other than the data type ++ data length presented here can be easily thought of, like the concatenation of other binary decision trees increasing the concatenation level. Optionally, a bit sequence defining a error check sum for checking the correctness of the self-descriptive data can also be added this way, thus providing additional error correction functionality to the identification system. It is emphasized that the aforementioned encryption methods merely serve as an example and that they can be readily altered, extended or reduced without departing from the scope of the invention.

Encoding schemes as shown in FIGS. 2a and 2b as well as other variable length encoding schemes can also be used to compress the data elements themselves. When focussing once more on FIG. 2a, the values at the leafs can be used to encode common values. In this particular example, the integer value 22 is described by the 4-bit sequence '1110' rather than by a common 8-bit or 16-bit sequence. Apart from using such binary trees, the data elements can also be compressed using other well-known compression techniques, like the removal of leading or trailing zeros from a bit pattern. This has the advantage that data types like integers and strings can be compressed by different methods in order to achieve optimal compression of each data type, thus further reducing the required storage capacity.

Figure 3:
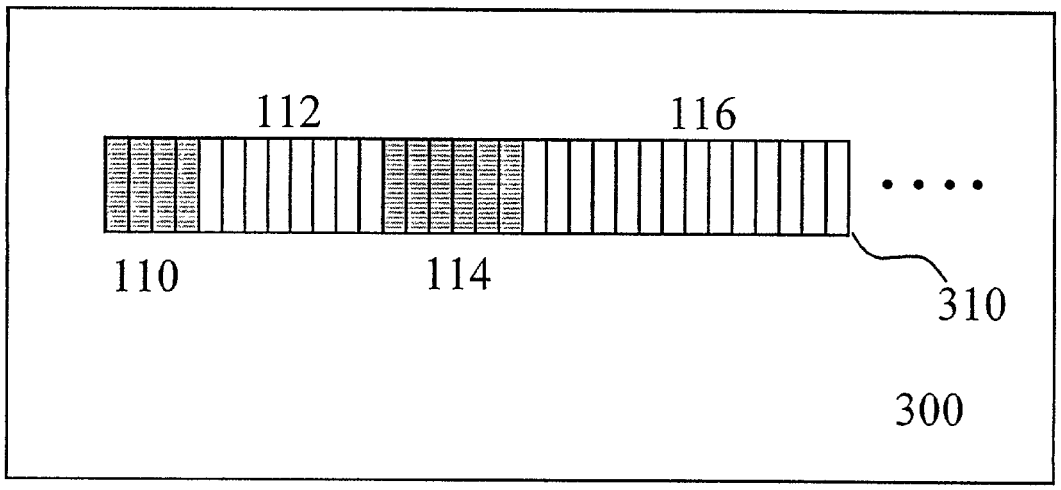
FIG. 3 depicts a data tag, according to an embodiment of the invention.

In FIG. 3, an exemplary implementation of data according to data format 100 in a data tag 300 has been given. Storage element 310 contains a first header 110, as indicated by the leftmost shaded area of 310. The 4-bit first header 110 is followed by a 8-bit first data element 112, a 6-bit second header 114 and a 14-bit second data element 116. Obviously, the sizes of these various headers and data elements have been chosen by way of example only. In addition, a larger number of headers and data elements may be present in the data tag 300, as indicated in FIG. 3 by the dots on the right hand side of storage element 310. At this point, it is emphasized that, although this data format has been primarily developed to enable flexible data storage in RF ID tags, it is not limited to this application domain. It is considered to be equally useful in all other identification applications where storage capacity is a scarse resource, like smart cards accessed through electrical contacts, magnetic swipe cards, optical bar codes, digital watermarks incorporated in pictures or video streams and so on. In addition, it is also of use in identifying and describing a peripheral device like a mouse for use e.g. configuration by a computer or other intelligent product. The necessary data is usually embedded in the mouse by hardware. By using data compaction as provided by data format 100 in a data tag 300, the required size of the data can be reduced, which results in a cost reduction for the production of such devices.

Figure 4:
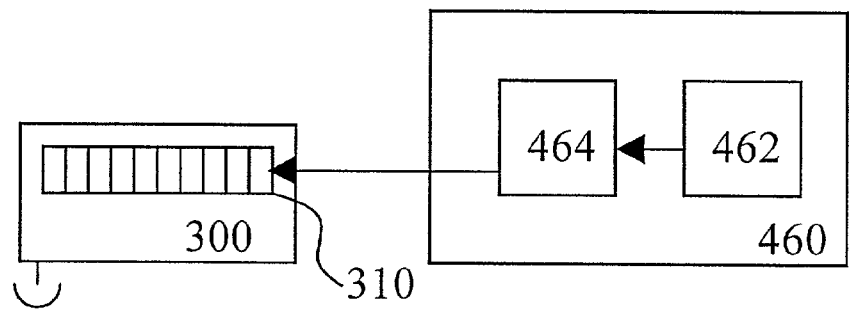
FIG. 4 shows a system for reading a data tag according to an embodiment of the invention.
Figure 4:
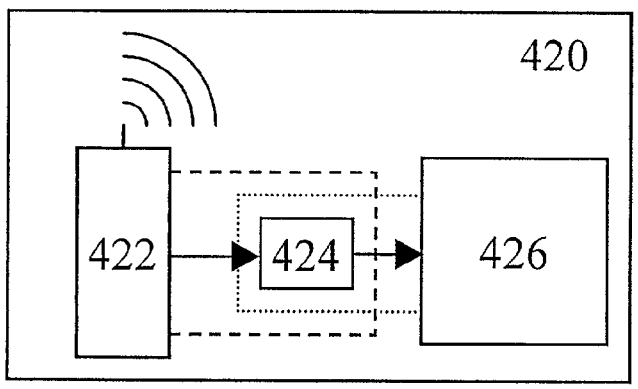

The use of data tags 300 of FIG. 3 requires a modification to a system capable of retrieving the identification information from such tags. System 420, shown in FIG. 4, includes the necessary modifications. The current commercially available systems typically comprise a data tag reader 422 and a computer 426. Such systems can easily be adapted to read data tags 300 by extending the system with module 424. This module can be implemented either in hardware or in software. Preferably, module 424 is a simple software code module that parses the data stream received by data tag reader 422. Typically, the module optionally comprises a look-up table (LUT) in some form to retrieve the appropriate data formats or encoding information, as well as the decoding algorithm to produce either header or data element in its uncompressed form. For instance, the means for retrieving a description of the first data element 112 from the first header 110 of the data tag 300 as well as the means for retrieving a description of the second data element 116 from the second header 114 of the data tag 300 can be as simple as an if-then-else construct implementing the binary decision trees stored in headers 110 and 114, although realizations using configurable LUTs provide an advantageous alternative.

In an embodiment of the data tag according to the invention, data elements 112 and 116 can be compressed too. Since the data elements 112 and 116 are preferably compressed by well-known encoding techniques, the required decoding algorithms are also standard algorithms known from literature.

The information retrieved from the headers 110 and 114 then has to be used to convert data elements 112 and 116 to a format appropriate for computer 426. To this end, module 424 needs to have means for generating a transformed first data element of the data tag 300 based on a retrieved description of the first data element 112 from the first header 110 of the data tag 300 and means for generating a transformed second data element of the data tag 300 based on a retrieved description of the second data element 116 from the second header 114 of the data tag 300. Again, these means can be realized by simple, well-known algorithms. Since these necessary programming constructs are well-known to anyone moderately skilled in the art, it is a trivial exercise for such a person to create such a module 424 for interpreting and converting the data stream either in software or in hardware on the basis of the aforementioned constructs or obvious alternatives.

Module 424 can be added to an existing system as an interface between reader 422 and computer 426, thus yielding system 420. It is emphasized that for the tag reading functionality, computer 426 is not an essential part of the system 420, since the computer merely interprets the data read from data tag 300. Since module 424 is easily realized as a small software program, it can be integrated in data tag reader 422, as indicated by the dashed box in FIG. 4, as well as in computer 426, as indicated by the dotted box in FIG. 4. The choice for either a stand-alone or an integrated application of module 424 will be governed by system requirements. In addition, tag reader 422 with incorporated module 424 can also be produced independently from the system, for instance as a peripheral device for a personal computer.

Finally, the self-descriptive data according to data format 100 can be stored on the data tag 300 using modified versions of an available data tag programming system 460. This modification exists of the addition of an encoding module 464 to programming system 460 for encoding the data from data source 462 according to data format 100. This encoding module 464 will not be described further, since it is the inverse of decoding module 424, and on the basis of the here presented teachings of module 424, it should be obvious to anyone skilled in the art how to construct encoding module 464.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for reading self-descriptive data from a hardware data tag, the method comprising:
   reading metadata by parsing a memory of the hardware data tag to access a first header comprising first metadata describing a first data element from the self-descriptive data using a tag reader;
   reading metadata by parsing the memory of the hardware data tag to access the first data element from the self-descriptive data using the tag reader;
   reading metadata by parsing the memory of the hardware data tag to access a second header comprising second metadata describing a second data element from the self-descriptive data using the tag reader;
   reading metadata by parsing the memory of the hardware data tag to access the second data element from the self-descriptive data using the tag reader; and
   interpreting at least one of the first and second data elements based on access to respective first or second headers using the tag reader, wherein the first data element is present in a first compressed form, wherein the second data element is present in a second compressed form that is different from the first compressed form, wherein the first data element is compressed using a binary tree, wherein the second data element is compressed by removing leading or trailing zeros from a bit pattern of the second data element, wherein the first and second data elements are of different field types that are sorted in an ascending or descending order with respect to their positions in a field type data structure, wherein the field type of the first data element or the second data element is represented by a difference between numeric values representing the field types of the first and second data elements, and wherein the interpreting the at least one of the first and second data elements comprises encoding the at least one of the first and second data elements based on a specific compression technique used to compress the first data element or the second data element.

2. The method as claimed in claim 1, further comprising:
   receiving a data stream at the tag reader, wherein the data stream comprises the self-descriptive data; and
   parsing a data stream.

3. The method as claimed in claim 2, wherein parsing the data stream further comprises parsing the data stream based on the self-descriptive data.

4. The method of claim 1, wherein the first header comprises a description of a length of the first data element, and wherein the second header comprises a description of a length of the second data element.

5. The method of claim 4, wherein at least one of the first header and the second header additionally comprises a bit pattern for checking correctness of the self-descriptive data.

6. The method of claim 1, wherein the first header comprises a description of the field type of the first data element, and wherein the second header comprises a description of the field type of the second data element.

7. The method of claim 6, wherein the description of the field type of the first data element is directly represented by a first numeric value, wherein the description of the field type of the second data element is indirectly represented by a second numeric value, said second numeric value being a difference between the first numeric value and a third numeric value directly representing the field type of the second data element.

8. The method of claim 1, wherein at least one of the first data element and the second data element comprises a uniform resource identifier.

9. The method of claim 1, wherein at least one of the first data element and the second data element comprises an internet protocol address.

10. A system comprising:
a radio frequency identification (RF ID) tag, wherein the RF ID tag comprises a transmitting antenna and a memory embedded in the RF ID tag, the memory containing self-descriptive data, the self-descriptive data comprising:
a first data element;
a first header comprising first metadata describing the first data element;
a second header comprising second metadata describing a second data element, wherein the first data element is present in a first compressed form, wherein the second data element is present in a second compressed form that is different from the first compressed form, wherein the first data element is compressed using a binary tree, wherein the second data element is compressed by removing leading or trailing zeros from a bit pattern of the second data element, wherein the first and second data elements are of different field types that are sorted in an ascending or descending order with respect to their positions in a field type data structure, and wherein the field type of the first data element or the second data element is represented by a difference between numeric values representing the field types of the first and second data elements;
a data tag reader comprising a receiving antenna, for receiving a first data stream from the RF ID tag, the data tag reader configured to:
read the first header from the self-descriptive data;
read the first data element from the self-descriptive data;
read the second header from the self-descriptive data; and
read the second data element from the self-descriptive data; and
a module for transforming a second data stream, communicatively coupled to the data tag reader, the module configured to:
retrieve a description of the first data element from the first header;
retrieve a description of the second data element from the second header;
generate a transformed first data element, the transformed first data element being responsive to a retrieved description of the first data element from the first header; and
generate a transformed second data element, the transformed second data element being responsive to a retrieved description of the second data element from the second header.

11. The system of claim 10, wherein the module is integrated into the data tag reader.

12. The system as claimed in claim 10, wherein at the data tag reader further is further configured to:
receive a data stream, wherein the data stream comprises the self-descriptive data; and
parse a data stream based on the self-descriptive data.

13. The system of claim 10, wherein the first header comprises a description of a length of the first data element, and wherein the second header comprises a description of a length of the second data element.

14. The system of claim 13, wherein at least one of the first header and the second header additionally comprises a bit pattern for checking correctness of the self-descriptive data.

15. The system of claim 10, wherein the first header comprises a description of the field type of the first data element, and wherein the second header comprises a description of the field type of the second data element.

16. The system of claim 15, wherein the description of the field type of the first data element is directly represented by a first numeric value, wherein the description of the field type of the second data element is indirectly represented by a second numeric value, said second numeric value being a difference between the first numeric value and a third numeric value directly representing the field type of the second data element.

17. The system of claim 10, wherein at least one of the first data element and the second data element comprises a uniform resource identifier.

18. The system of claim 10, wherein at least one of the first data element and the second data element comprises an internet protocol address.

* * * * *